Figure 1:
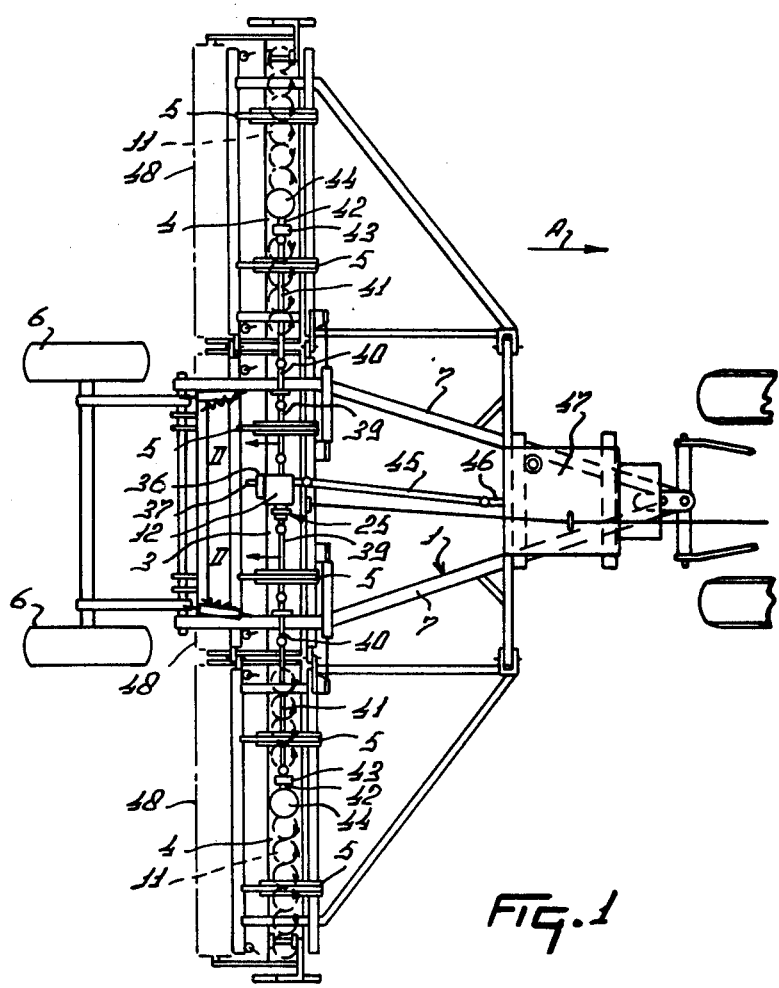

United States Patent [19]

van der Lely

[11] 4,098,345

[45] Jul. 4, 1978

[54] SOIL CULTIVATING IMPLEMENTS

[75] Inventor: Ary van der Lely, Weverskade, Netherlands

[73] Assignee: C. van der Lely N.V., Maasland, Netherlands

[21] Appl. No.: 760,862

[22] Filed: Jan. 21, 1977

[30] Foreign Application Priority Data

Jan. 21, 1976 [NL] Netherlands .................. 7600577

[51] Int. Cl.² ........................................... A01B 33/08
[52] U.S. Cl. .................................... 172/59; 172/103; 172/125
[58] Field of Search ................ 172/59, 125, 103, 111

[56] References Cited

U.S. PATENT DOCUMENTS

| | | | |
|---|---|---|---|
| 2,940,534 | 6/1960 | Chattin | 172/125 |
| 3,028,919 | 4/1962 | Smith | 172/125 |
| 3,885,633 | 5/1975 | Lely et al. | 172/59 |
| 3,971,445 | 7/1976 | Lely | 172/59 |

FOREIGN PATENT DOCUMENTS 1,148,792  5/1963  Fed. Rep. of Germany ....... 172/125

*Primary Examiner*—Richard J. Johnson

*Attorney, Agent, or Firm*—Mason, Mason & Albright

[57] ABSTRACT

A cultivator implement has an elongated central frame portion that supports a row of rotatable soil working members and a gear box with an imput connectable to a p.t.o. The gear box houses a driving shaft that extends horizontally transverse to the direction of travel and parallel to the frame portion. The driving shaft has a first pinion at one end that is engaged by the imput and a second smaller pinion is journalled in the side wall opposite the first pinion. The second pinion has an outer socket and a bore that receives the driving shaft. The outer end of the driving shaft has a socket that interconnects with the pinion's outer socket through lugs bolted together by a breakable bolt. The second pinion directly engages a third pinion that is on a shaft of one of the soil working members to drive same. If one of the soil working members jams, the bolt breaks and the driving shaft rotates relative to the second pinion. In one arrangement, the driving shaft extends through the gear box sides to respective transmission shafts geared to second and third groups of soil working members at each lateral side of the central frame portion. Respective gear boxes on the latter groups also can have overload release mechanisms.

16 Claims, 2 Drawing Figures

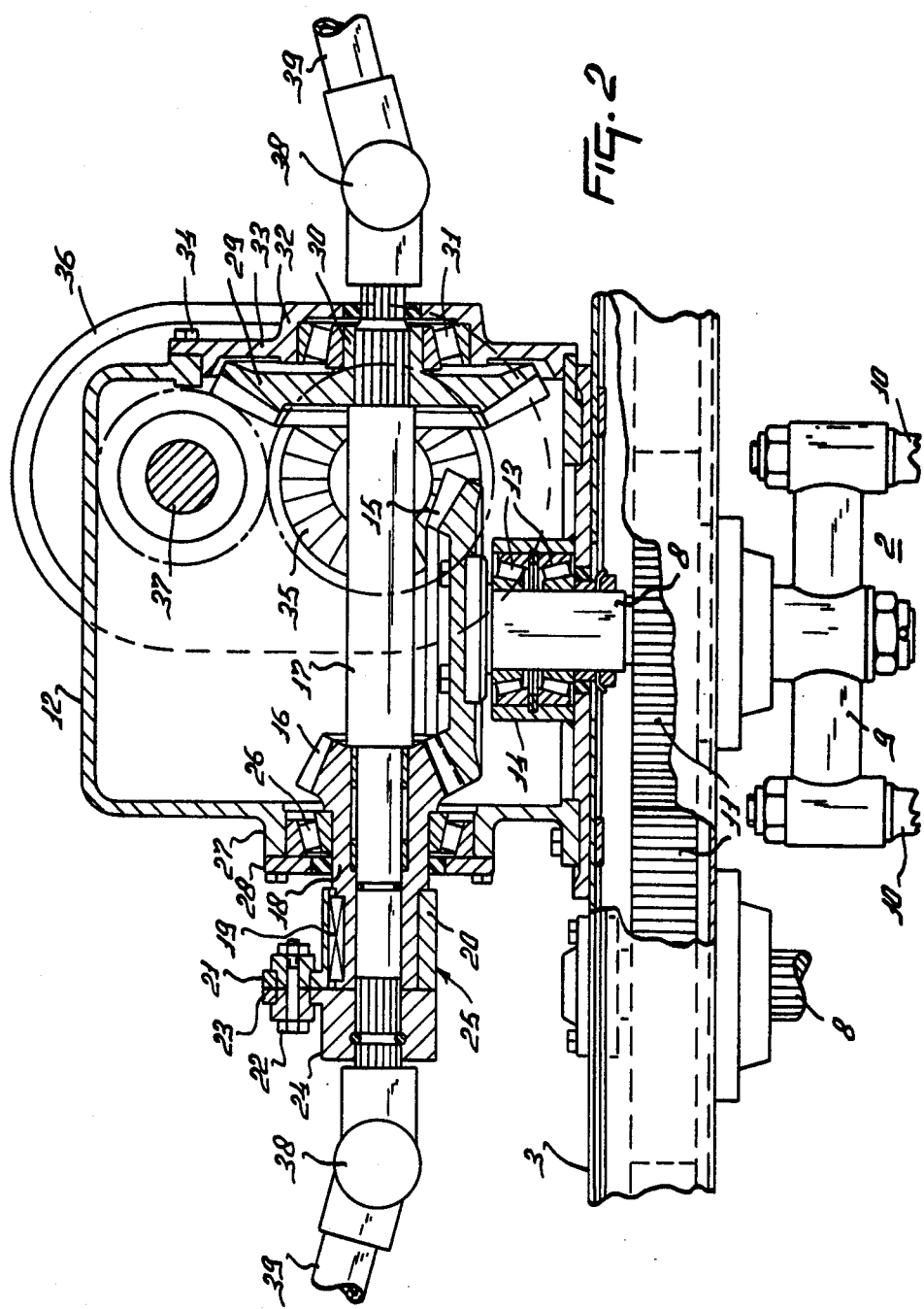

SOIL CULTIVATING IMPLEMENTS

According to the invention, there is provided a soil cultivating implement of the kind set forth, wherein a driving pinion is mounted on a driving shaft of the transmission by an overload release mechanism.

For a better understanding of the invention, and to show how the same may be carried into effect, reference will now be made, by way of example, to the accompanying drawings, in which:

FIG. 1 is a somewhat diagrammatic plan view of a soil cultivating implement in accordance with the invention connected to the rear of an agricultural tractor, and FIG. 2 is a section, to an enlarged scale, taken on the line II—II in FIG. 1.

Referring to the drawings, the soil cultivating implement that is illustrated therein has a frame that is generally indicated by reference 1, said frame carrying three groups of rotary soil working or cultivating members 2 that are arranged in corresponding rows which, when the implement is disposed in an operative position on flat horizontal land, are in substantially horizontal alignment with one another in a direction that is substantially perpendicular, or at least transverse, to the intended direction of operative travel of the implement that is indicated by an arrow A in FIG. 1 of the drawings. The three groups of rotary soil working or cultivating members 2 are thus arranged in side-by-side relationship, a central group thereof being carried by a central frame portion 3 and the two flanking groups being carried by substantially symmetrically identical outer frame portions 4. Each of the three frame portions 3 and 4 is connected to the frame 1 through the intermediary of a corresponding pair of spaced parallelogram linkages 5 and this arrangement enables each one of the three frame portions to move upwardly and downwardly relative to the frame 1 independently of the other two. In addition, the two outer frame portions 4 are turnable relative to the central frame portion 3 about corresponding substantially horizontal axes that extend parallel or substantially parallel to the direction A. These arrangements enable the rotary soil working or cultivating members 2 to match undulations in the surface of the ground over which the implement is travelling to a satisfactory extent. The path of travel of the implement can be considerably reduced, for inoperative transport purposes, by tilting both of the outer frame portions 4 and the parts which they carry upwardly and inwardly relative to the central frame portion 3 about the corresponding axes that extend substantially horizontally parallel to the direction A. Upward and inward displacements of the outer frame portions 4 through substantially 90° about the corresponding axes are normally produced for this purpose and simple retaining means (not shown) are preferably provided to maintain the outer frame portions 4 positively in their upwardly tilted positions. The tilting is brought about by horizontal piston and cylinder assemblies whose construction and arrangements it is not necessary to describe in detail for the purposes of the present invention but whose positions can be seen in FIG. 1 of the drawings just in front of the central frame portion 3 with respect to the direction A. The hydraulic piston and cylinder assemblies are connected to the hydraulic system of the agricultural tractor or other vehicle which operates the implement when the latter is in use. The rear of the frame 1 with respect to the direction A is provided with a pair of horizontally spaced apart ground wheels 6 which support it from the ground surface both during operation and inoperative transport and the front of said frame has a draw bar 7 arranged, as illustrated, for pivotal connection to the tow bar or the like of a co-operating tractor or other operating vehicle. The ground wheels 6 are upwardly and downwardly displaceable in position relative to the frame 1 so that, for inoperative transport purposes, the rotary soil working or cultivating members 2 of the central frame portion 3 can be brought to a level at which they will be clear of contact with the ground.

Each rotary soil working or cultivating member 2 is firmly but releasably secured to the lowermost end of a substantially vertical, or at least upwardly extending, shaft 8 (see FIG. 2) that is rotatably journalled in the hollow frame portion 3 or 4 concerned. Said end of each shaft 8 is splined or otherwise keyed for co-operation with internal splines of a hub at the center of a corresponding substantially horizontally disposed tine support 9 of the member 2 concerned. The opposite ends of each tine support 9 are provided with substantially cylindrical sleeve-like tine holders whose axes are substantially parallel to the axis of the corresponding shaft 8 and said tine holders firmly but releasably receive fastening portions of corresponding rigid tines 10. The tines 10 are not illustrated in detail in the drawings but each of them has a lower soil working portion that extends downwardly from its integral junction with the corresponding fastening portion so as to penetrate into the soil which is to be cultivated during operation of the implement. In the implement that is being described by way of example, each of the three groups of rotary soil working or cultivating members 2 comprises twelve of those members 2 and it can be seen from FIG. 2 of the drawings that each of the corresponding twelve shafts 8 is provided, inside the hollow frame portion 3 or 4 concerned, with a straight-toothed or spur-toothed pinion 11, the row of twelve pinions 11 for each group being so dimensioned and arranged that the teeth of each pinion 11 are in mesh with those of its immediate neighbour, or with those of both of its immediate neighbours, in the row thereof.

One of the center pair of twelve shafts 8 that correspond to the central group of rotary soil working or cultivating members 2 that is supported by the frame portion 3 has an upward extension (see FIG. 2) through the top of said frame portion 3 into a gear box 12 fastened to the top of the frame portion 3. The extension is rotatably supported by an opposed pair of tapered roller bearings 13 mounted in a sleeve-shaped housing 14 whose lower edge is welded to a bottom plate of the gear box 12. The shaft extension has a flange at it upper end and a crown wheel or bevel pinion 15 is firmly but releasably bolted to the top of said flange. The teeth of the crown wheel or bevel pinion 15 are in driven mesh with those of a smaller bevel pinion 16 mounted on a substantially horizontal shaft 17 that extends perpendicular or substantially perpendicular to the direction A and parallel or substantially parallel to the transverse (to the direction A) length of the central frame portion 3. The opposite ends of the shaft 17 project from the sides of the gear box 12 and it will be noted from FIG. 2 of the drawings that the pinion 16 has an elongate hub 18 that also projects from one side of the gear box 12 in surrounding relationship with a portion of the shaft 17, it being noted that the pinion 16, and thus its hub 18, is rotatable relative to the shaft 17 upon an overload occuring as will be discussed below. A box-shaped sleeve or socket 20 is arranged in surrounding relationship with the end of the elongate hub 18 of the pinion 16 that projects from one side of the gear box 12 and is fixed in position, rotationally, relative to said hub 18 by a key 19. The sleeve or socket 20 carries a projecting apertured lug 21 that registers with a similar lug 23 carried by a box-shaped sleeve or socket 24 provided with an internally splined bore whose splines co-operate with external splines on a registering end portion of the shaft 17. The two lugs 21 and 23 are secured to one another by a shear pin that is in the form of a replaceable bolt 22, the shank of said bolt 22 actually co-operating with shouldered locating washers that position said bolt correctly relative to the apertures in the two lugs 21 and 23. The parts 20 to 24 inclusive together constitute an overload release mechnism that is generally indicated by the reference 25 and that is effective in fixing the bevel pinion 16 in position relative to the shaft 17 unless an overload that would tend to cause damage or breakage is encountered.

The hub 18 of the bevel pinion 16 is rotatably supported from a substantially horizontally disposed housing 27 in one of the upright side walls of the gear box 12 by a tapered roller bearing 26, the mouth of said housing 27 being closed by a releasable cover 28 that incorporates a seal. The shaft 17 is provided, towards the end thereof remote from the overload release mechanism 25, with a large bevel pinion 29 having an internally splined hub 30 whose splines co-operate with matching splines on a co-operating portion of the shaft 17. The external surface of the hub 30 is rotatably supported relative to a substantially horizontal housing 32 by a tapered roller bearing 31. The housing 32 forms part of a portion 33 of that upright side wall of the gear box 12 that is opposite to the side wall which exhibits the housing 27, said wall portion 33 being releasably secured to the remainder of the side wall concerned by bolts 34. The teeth of the bevel pinion 29 are in driven mesh with those of a smaller bevel pinion 35 carried, inside the gear box 12, by a rotary shaft that extends substantially horizontally parallel to the direction A. The rearmost end of said shaft, with respect to that direction, projects into a change-speed gear 36 that is mounted at the back of the gear box 12. A further shaft 37 that also extends substantially horizontally parallel to the direction A in vertically overlying, but spaced, relationship with the shaft that carries the pinion 35 is of greater length than the last mentioned shaft and projects from both the front of the gear box 12 and the rear of the change-speed gear 36 secured to the back of the gear box 12. It is not necessary to describe or to illustrate the change-speed gear 36 in detail for the purposes of the present invention but, briefly, the shaft 37 and the underlying and parallel shaft have splined portions in the casing of the change-speed gear which splined portions can carry the matching internally splined hubs of a chosen one of a number of pairs of straight-toothed or spur-toothed pinions of different sizes. The particular pair of pinions that is chosen, and its arrangement relative to the splined portions of the two shafts, dictates the transmission ratio between the shaft 37 and the underlying and relatively parallel shaft and thus the speed at which the soil working or cultivating members 2 will be rotated in response to a predetermined input speed applied to the forwardly projecting end of the shaft 37. It is most desirable to be able to vary the speed of rotation of the members 2 in dependence upon the nature and condition of the soil that is to be tilled by the implement and the particular purpose for which that soil is intended when the cultivation has been completed.

The extreme end of the shaft 17 which neighbours the overload release mechanism 25 is connected by a universal joint 38 to one end of a telescopic transmission shaft 39 whose opposite end is connected by a further universal joint to one end of a shaft 40 (FIG. 1) rotatably supported from a portion of the frame 1. The opposite end of the shaft 40 is, in turn, connected by a further universal joint to one end of a telescopic transmission shaft 41 and that shaft, in turn, is connected to the rotary input shaft 42 of a gear box 44 by a still further universal joint and an overload release mechanism 43 which may be similar to the overload release mechanism 25 is comprising a shear pin that may again be provided in the form of a shear bolt. The gear box 44 is mounted on top of the corresponding outer frame portion 4 and contains a bevel pinion and shaft transmission (not illustrated) in driving connections with an upward extension of the shaft 8 corresponding to the underlying soil working or cultivating member 2 of the group concerned. It will be apparent from both of the Figures of the drawings that the end of the shaft 17 that is remote from the end thereof carrying the overload release mechanism 25 is drivingly connected to the soil working or cultivating members 2 of the other outer group by parts which are substantially symmetrically identical, or at least similar, to the parts 38 to 44 inclusive that have just been described. The two outer frame portions 4 contain corresponding rows of the straight-toothed or spur-toothed pinions 11 (FIG. 2) said pinions 11 being mounted on the/corresponding shafts 8 in the two frame portions 4.

The leading end, with respect to the direction A, of the shaft 37 that projects forwardly from the front of the gear box 12 is connected by a telescopic transmission shaft 45 having universal joints at its opposite ends to a rearwardly directed output shaft 46 of an engine 47, which will usually be an internal combustion engine, supported from beneath by bearer beams fastened to the draw bar 7 towards the front thereof with respect to the direction A. As can be seen in outline in FIG. 1 of the drawings, the leading end of the draw bar 7 is preferably provided with an underlying supporting ground wheel. It is not absolutely essential to provide the engine 47 in a case in which the implement is destined to be used with a tractor or other operating vehicle of sufficiently high power rating to drive thirty-six rotary soil working or cultivating members. In such a case, the engine 47 may be omitted and the leading end of the shaft 37 may be arranged to be driven from the power take-off shaft of such a tractor or other vehicle. The tractor or other vehicle will then operate the implement in the sense of driving its rotary soil working or cultivating members 2 as well as operating it in the sense of moving it operatively over the ground in the direction A.

In the use of the implement that has been described, the leading end of its draw bar 7 is connected to the tow bar or the like of an agricultural tractor or other operating vehicle and, before work commences, the maximum depth to which the tines 10 of the members 2 will be able to penetrate into the soil is determined by the level at which the ground wheels 6 are set relative to that of the frame 1 and by the levels at which rotary supporting members of the three indivudual frame portions 3 and 4 are set relative to those frame portions. The rotary supporting members that have just been mentioned are afforded, in the embodiment that is being described, by three ground rollers 48 of open formation whose opposite ends are connected by arms to the opposite ends of the three frame portions 3 and 4, said arms being upwardly and downwardly pivobtable relative to the frame portions and being provided with means to retain them in chosen positions about the axes of their pivotability. In addition to adjusting the maximum depth to which the tines 10 of the members 2 will be able to penetrate into the soil, the change-speed gear 36 is, if required, adjusted before work commences to determine the speed at which the members 2 will revolve. As the implement moves operatively over the land in the direction A, the soil working or cultivating members 2 are positively rotated in the directions that are indicated, for some of them, by small arrows in FIG. 1 of the drawings. These directions are such that each member 2 will revolve in the opposite sense to that of its neighbour, or to those of both of its neighbours, in at least the same group of twelve members 2. The axes of rotation of immediately neighbouring members 2 in each group are preferably, but not essentially, spaced apart from one another by distances of substantially 25 centimeters and the tines 10 of each member 2 are arranged to work an individual strip of land having a width that is a little greater than said spacing with the result that the strips of land worked by the individual members 2 overlap one another to produce, in effect, a single broad strip of worked soil. In the embodiment that is being described, with the preferred spacing between the axes of rotation of the shafts 2 of substantially 25 centimeters, said broad strip will have a width of substantially 9 meters. The three groups of members 2 are located so close to one another that there will be no significant discontinuities between the strips of ground that correspond to the three groups of members 2, if any. The shaft 17 of the gear box 12 is driven from the engine 47 by way of the output shaft 46, the telescopic transmission shaft 45 having universal joints at its opposite ends, the shaft 37, the change-speed gear 36, the shaft carrying the pinion 35, and the pinion 29. Said shaft 17 constitutes a driving shaft that extends substantially horizontally perpendicular, or at least transverse, to the direction A for all three of the groups of rotary soil working or cultivating members 2. The driving shaft 17 carries the pinion 16 which pinion 16 is mounted on said shaft 17 so as to be rotatable relative thereto but so as normally to be effectively rigid therewith by virtue of the provision of the overload release mechanism 25 and particularly its shear bolt 22. The teeth of the pinion 16 transmit drive to those of the larger crown wheel or bevel pinion 15 and thus to the upward extension of one of the shafts 8 of the central group of soil working or cultivating members 2 as shown in FIG. 2, it being noted that the longitudinal axis/axis of rotation of the shaft 17 is in perpendicular, or substantially perpendicular, relationship with the longitudinal axis/axis of rotation of said upward shaft extension. The opposite ends of the driving shaft 17 that project from the sides of the gear box 12 are drivingly connected in the manner described above to the input shafts 42 of the two gear boxes 44, both driving connections being effected through the intermediary of the corresponding overload release mechanisms 43.

In the event of a stone or other hard object becoming jammed between the tines 10 of two neighbouring soil working or cultivating members 2, the resistance to rotation of the corresponding shafts 8 will rise to a very high level in a substantially instantaneous manner and, if this level is such as to cause breakage of the shear bolt 22 or of the corresponding shear bolt of one of the mechanisms 43, said bolt will break and drive will immediately be discontinued to the corresponding group of rotary soil working or cultivating members 2 so that those members, and the transmission thereto, are prevented from becoming seriously damaged or broken by the blockage. Once the blockage has been cleared, the broken shear bolt 22 can quickly, easily and inexpensively be replaced with only a very short interruption to the work so long as the necessary spares and simple tools are kept to hand. It will be noted that the incorporation of the overload release mechanism 25 into the mounting of the bevel pinion 16 on the shaft 17 allows the mechanism to have a very compact formation which is mounted in a readily accessible manner. This is, of course, equally true of the disposition of the overload release mechanisms 43 that protect the two outer groups of rotary soil working or cultivating members 2. The end of the shaft 37 that projects from the rear of the change-speed gear 36 may, when required, be employed to drive the moving parts of an implement that is to be used in combination with the soil cultivating implement such, purely for example, as a seed drill or fertiliser distributor.

Although certain features of the soil cultivating implement that has been described and/or that are illustrated in the accompanying drawings will be set forth in the following claims as inventive features, it is emphasised that the invention is not necessarily limited to those features and that is includes within its scope each of the parts of the soil cultivating implement that has been described, and/or is illustrated in the accompanying drawings, both individually and in various combinations.

What we claim is:

1. A soil cultivating implement comprising a frame and a plurality of rotatable soil working members mounted on corresponding upwardly extending shafts that are supported on a portion of said frame, driving means connected to rotate said members about axes defined by said shafts, said driving means including imput means that engages a first pinion on a substantially horizontal driving shaft within gear box means, a second pinion being spaced from the first pinion within said box and connected to said driving shaft through an external overload release mechanism, said second pinion engaging a third pinion on one of said upwardly extending shafts within said box means, whereby the drive to said one shaft is interrupted upon overload.

2. An implement as claimed in claim 1, wherein said overload release mechanism comprises one part which is connected to a hub of said second pinion and a further part that adjoins said one part and is connected to said driving shaft.

3. An implement as claimed in claim 2, wherein said one part is a socket on said hub of the second pinion that extends through said box means and said further part is a second socket that is splined to said driving shaft externally of said box means.

4. An implement as claimed in claim 3, wherein each of said sockets has a projecting lug and the two lugs are interconnected by at least one shear bolt.

5. An implement as claimed in claim 4, wherein said second pinion has a bore and said driving shaft extends through that pinion and its hub to a spline connection to said second socket.

6. An implement as claimed in claim 5, wherein said second pinion is a bevel pinion with teeth in driving mesh with the teeth of a crown wheel pinion on said one shaft within said gear box means.

7. An implement as claimed in claim 6, wherein said driving shaft extends transverse to the direction of travel of the implement and further groups of soil working members are mounted on additional frame portions that flank said first mentioned frame portion, said further members having respective transmission shafts that are interconnected to the driving shaft.

8. An implement as claimed in claim 7, wherein there are three groups of soil working members that are arranged in side-by-side relationship, said driving shaft being rotatably journalled in a gear box mounted on the first-mentioned frame portion which supports the central group of soil working members, the opposite ends of said driving shaft projecting from said gear box to transmit drive to the respective transmission shafts that rotate outer groups of said soil working members.

9. An implement as claimed in claim 8, wherein the soil working members of each of the three groups are rotatable about upwardly extending axes, said axes being defined by shafts journalled in corresponding frame portions for said groups, said frame portions being hollow and containing transmission gears that are drivingly connected to one another and to said shafts.

10. An implement as claimed in claim 9, wherein said transmission gears are straight-toothed pinion gears.

11. An implement as claimed in claim 10, wherein said third pinion is mounted on a shaft extention and said extention is connected to one of the upwardly extending shafts that corresponds to a soil working member of said central group.

12. A soil cultivating implement comprising a frame and a plurality of rotatable soil working members mounted on corresponding upwardly extending shafts that are supported on a portion of said frame, driving means connected to rotate said members about axes defined by said shafts, said driving means including imput means that engages a first pinion on a driving shaft, a second pinion being spaced from the first pinion and mounted on said driving shaft, said driving shaft, and first and second pinions being housed within a gear box supported on the frame portion, said driving shaft extending through a bore in said second pinion and being normally rotatable relative to the second pinion, interconnected lugs comprising an overload release mechanism being positioned between said second pinion and driving shaft preventing relative rotation between the second pinion and said driving shaft, a third pinion within said housing being directly engaged by said second pinion and said third pinion being connected to one of said upwardly extending shafts.

13. An implement as claimed in claim 12, wherein said driving shaft is splined to a first socket and a second socket is connected to said second pinion, said lugs being mounted on the sockets and being located outside the gear box.

14. An implement as claimed in claim 13, wherein an input shaft extends in said gear box substantially perpendicular to said driving shaft and said imput shaft engaging said first pinion.

15. An implement as claimed in claim 14, wherein said imput shaft is positioned to be driven from a p.t.o. via a change-speed gear located at the front of said gear box.

16. An implement as claimed in claim 14, wherein said driving shaft extends substantially horizontal and the first and second pinions are journalled on opposite side walls of said box.

* * * * *